W. R. KING.
Apparatus for Evaporating and Distilling.
No. 34,062. Patented Jan'y 7, 1862.
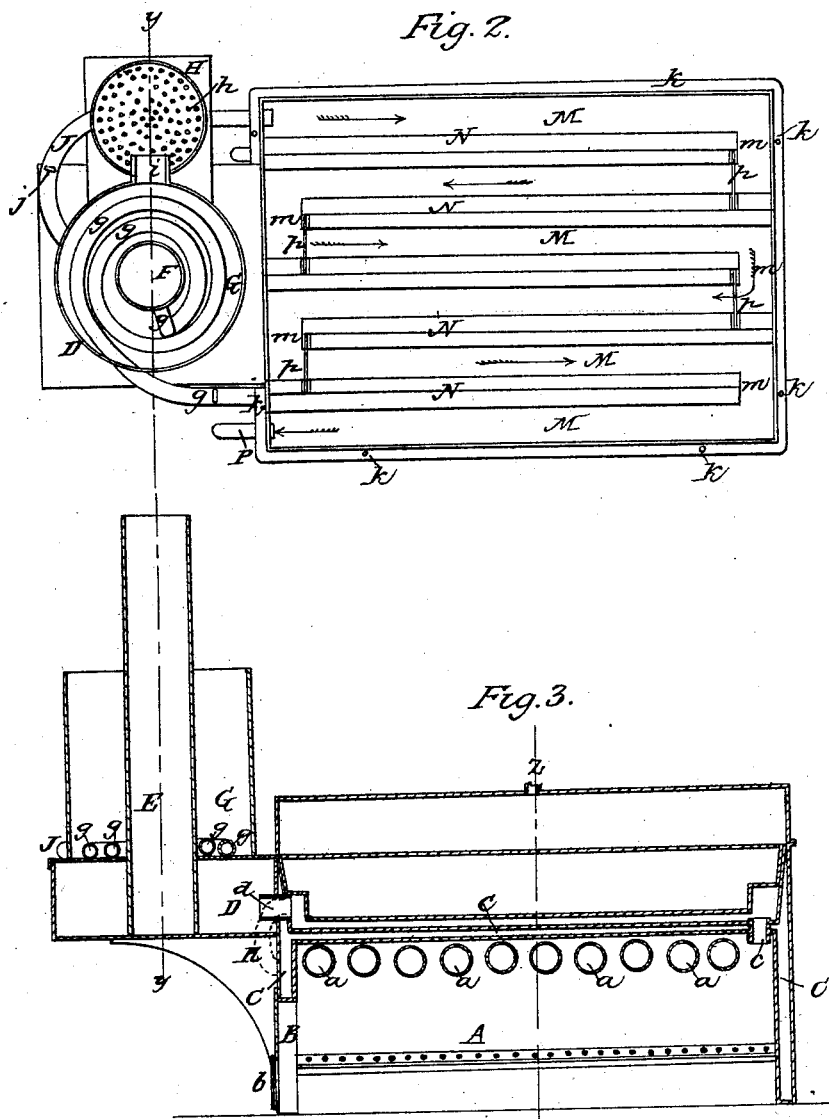
Witnesses:
R. L. Osgood
F. A. Follett.
Inventor:
William R. King
J. S. Brown

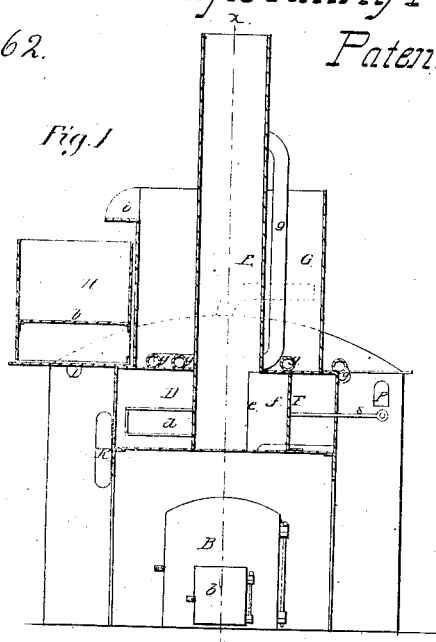

UNITED STATES PATENT OFFICE.

WILLIAM R. KING, OF YELLOW SPRINGS, OHIO.

IMPROVED APPARATUS FOR EVAPORATING AND DISTILLING.

Specification forming part of Letters Patent No. 34,062, dated January 7, 1862.

*To all whom it may concern:*

Be it known that I, WILLIAM R. KING, of Yellow Springs, in the county of Greene and State of Ohio, have invented a new and Improved Apparatus for Evaporating and Distilling; and I do hereby declare that the following is a full and exact description thereof, reference being had to the accompanying drawings, making part of this specification—

Figure 1 being a front elevation of the apparatus, a portion being shown in vertical section in the plane indicated by the line $y\ y$, Figs. 2 and 3; Fig. 2, a plan of the apparatus; Fig. 3, a vertical section thereof in the plane indicated by the line $x\ x$, Fig. 1; Fig. 4, plan of the under side of a part detached; Fig. 5, a vertical section of the apparatus in the plane indicated by the line $z\ z$, Fig. 3.

Like letters designate corresponding parts in all the figures.

My improved apparatus is provided, first, with a fire chamber or arch, C, of boiler-iron or other equivalent material in double plates at the sides and ends, with an inclosed space between them for containing water, substantially as represented in the drawings. There are also tubes $a\ a$, extending across from side to side of the chamber, as shown in Figs. 3 and 5, both ends of which tubes open into the inclosed water-space of the chamber. A fire-grate, A, of ordinary construction, is inserted in the chamber at a suitable distance below the tubes $a\ a$, for supporting the fuel, and a door, B, closes the front of the fire-chamber in the ordinary manner; second, an evaporating-pan is located within and supported by the outer side and end plates of the fire-chamber, which extend upward sufficiently for the purpose. This evaporating-pan is constructed and arranged substantially as follows: The upper edges of the sides and ends of the pan are provided with projecting lips, which project over the extended sides and ends of the fire-chamber, (generally provided with corresponding lips or ledges for the purpose of securing the evaporating-pan in place,) and are somewhat flaring, so that the bottom of the pan does not fill the space inclosed by the fire-chamber plates. The bottom of the pan extends down within a little distance of the top plate of the fire-chamber, thus leaving a narrow space between for the water and steam within the water-space of the fire-chamber to occupy. Within this evaporating-pan, extending forward and backward parallel with each other, and at a suitable distance apart, are as many horizontal pipes N N as the pan will thus contain, substantially as shown in the drawings. They are suitably made of diamond shape, as represented, and they are all connected with one another and with the sides and ends of the evaporating-pan by a partition-plate, so as to completely cover and inclose the space K in the pan below, and thus form a broad flue for the fire and products of combustion passing from the fire-chamber up through a throat, $c$, near the back of the apparatus; thence to be conducted forward through the evaporating-pan, and then to pass through a throat, $d$, into a heating-chamber, D, and finally to escape into a smoke-pipe, E.

The pipes N N are intended to conduct steam through the evaporating-pan, generally receiving it from the water-space of the fire-chamber C, where it is rapidly generated by the heat of the fire acting on so large a surface of the interior plates thereof and upon and all around the tubes $a\ a$. The steam first ascends through a conducting-pipe, R, into one of the outside pipes, N N, and passes successively through all of these pipes, finally passing out from the other outside pipe through a conducting-pipe, $g$, which is coiled around in a vessel, G, surrounding the smoke-pipe E, and finally discharges the exhausted steam into the said smoke-pipe, substantially as represented. The steam-pipes N N are connected at alternate ends successively with one another by short connecting-pipes $n\ n$, (represented in the inverted plan of the evaporating-pan, Fig. 4,) the arrangement of which pipes, in connection with the steam-pipes N N, is clearly seen to conduct the steam as specified above. These connecting-pipes $n\ n$ are flattened at the bottom, so as to offer the least obstruction to the passage through the flue K beneath.

The shallow, long, narrow spaces or troughs M M contain the sirup or liquid to be evaporated, which is constantly kept at a uniform but shallow depth therein. These spaces are necessarily connected with one another by openings m m around the alternate shortened ends of the steam-pipes N N, substantially as shown in Fig. 2, so that the sirup or liquid, as it is received from a feeding-pipe, I, into the outermost space, M, on one side, continually flows through the successive spaces, progressing in the same way as the steam, as indicated by arrows in the same figure, and, finally, is discharged from the outermost one on the other side of the pan through a spout or faucet, P, into a suitable receiving-vessel. The flow of the sirup or liquid is so regulated in relation to the evaporating-power of the furnace and steam, and to its own nature and condition, as to be reduced to the desired condition by the time it flows through all the spaces or troughs of the evaporating-pan and arrives at the discharging-spout. Screens or strainers p p are placed across the entrance to each space M M, to keep back all scum and impurities that may be generated and collected in the sirup or liquid. These strainers are removable for the purpose of cleaning from said scum and impurities.

The sirup or liquid to be subjected to evaporation is first heated in the vessel G, surrounding the smoke-pipe E, by the escaping heat and steam proceeding from the evaporator above described. A pipe, J, provided with a stop-cock, j, conducts the greater part of the heated sirup or liquid from the bottom of said vessel G into another receiving-vessel, H, which is provided with a strainer, h, above the said pipe J, for the purpose of separating the impurities from a portion of the more impure liquid, which flows from the top of the vessel G, through a spout, i, directly into the top of said receiver. Thence the sirup or liquid flows immediately into the evaporating-pan through the pipe I, as before specified. The products of combustion pass out of the heating-chamber D into the smoke-pipe E through an opening, e, in one side of the smoke-pipe, and this opening is regulated by a damper, F, Fig. 1, provided with a handle, s, reaching outside. A partition, f, compels the products of combustion to pass from the throat d entirely around the smoke-pipe E before escaping through the same. A stop-cock, r, also regulates the escape of steam from the evaporator through the pipe g.

The evaporating-pan is inclosed by a cover, L, which is secured to the apparatus by screws h k or otherwise. It has a pipe, l, for carrying off the vapors after evaporation, or for conducting the volatilized liquors to the worm of a refrigerator in the case of distilling. For simply evaporating the cover L may be removed.

Instead of generating steam in the water-space of the fire-chamber C, it may be generated in a separate boiler or vessel, and conducted thence directly into the steam-pipes N N. Thus both fire and steam may be employed simultaneously for evaporating or distilling with the apparatus, or either fire or steam may be used separately, as may be preferred or occasion may require.

What I claim as my invention, and desire to secure by Letters Patent, is—

1. The combination of the water-space c and tubes a a around and above the furnace with the evaporating-pan situated in the upper part of said water-space, substantially as and for the purpose specified.

2. Constructing the evaporating-pan with a plain bottom and diamond-shaped pipes or passages N N, connected by partition-plates above the bottom, so as to form a flue-space, K, therein, substantially in the manner and for the purpose described.

3. The combination of the steam pipes or passages N N and their connecting-pipes n n with the evaporating-troughs M M and their connecting-openings m m, substantially as described, so that the steam and sirup or liquid flow side by side together through their whole course, in the manner and for the purpose herein specified.

4. In combination with the steam pipes or passages and troughs, arranged as described, the strainers p p, removable, as specified, for the purpose set forth.

5. The combination of the receiving-vessel H, having a strainer, h, therein, with the heating-vessel G, in such a manner as to receive the clear liquid thereform through a pipe, J, below, and the impure liquid therefrom through a spout, i, (or its equivalent,) above, said strainer, for the purpose specified.

In testimony whereof I have hereunto set my hand this 30th day of March, 1861.

WM. R. KING.

Witnesses:
 EZRA BUSS,
 JULIUS CONE.